United States Patent [19]

DeLong et al.

[11] 3,883,806

[45] May 13, 1975

[54] DEMODULATOR CIRCUIT FOR PHASE MODULATED COMMUNICATION SIGNALS

[75] Inventors: Vincent R. DeLong, Marion; Robert L. Craiglow, Cedar Rapids, both of Iowa

[73] Assignee: Rockwell International Corporation, Dallas, Tex.

[22] Filed: Mar. 7, 1974

[21] Appl. No.: 449,158

[52] U.S. Cl. .................. 325/320; 178/67; 325/419; 329/124

[51] Int. Cl. .............................................. H03d 3/00

[58] Field of Search ............ 329/122, 124; 325/320, 325/419, 346; 328/155; 178/67, 88

[56] References Cited

UNITED STATES PATENTS 3,109,143 10/1963 Gluth .................................. 325/320

3,600,700 8/1971 Matsuo ................................ 329/124

3,787,775 1/1974 Lanning .............................. 329/122

*Primary Examiner*—George H. Libman

*Attorney, Agent, or Firm*—Howard R. Greenberg

[57] ABSTRACT

A demodulator circuit provides a local reference signal which is continuous irrespective of phase modulation in the communication signal to be demodulated by reversing the phase of the output of a phase locked loop voltage controlled oscillator each time the communication signal reverses phase prior to comparing the two in a phase detector.

4 Claims, 1 Drawing Figure

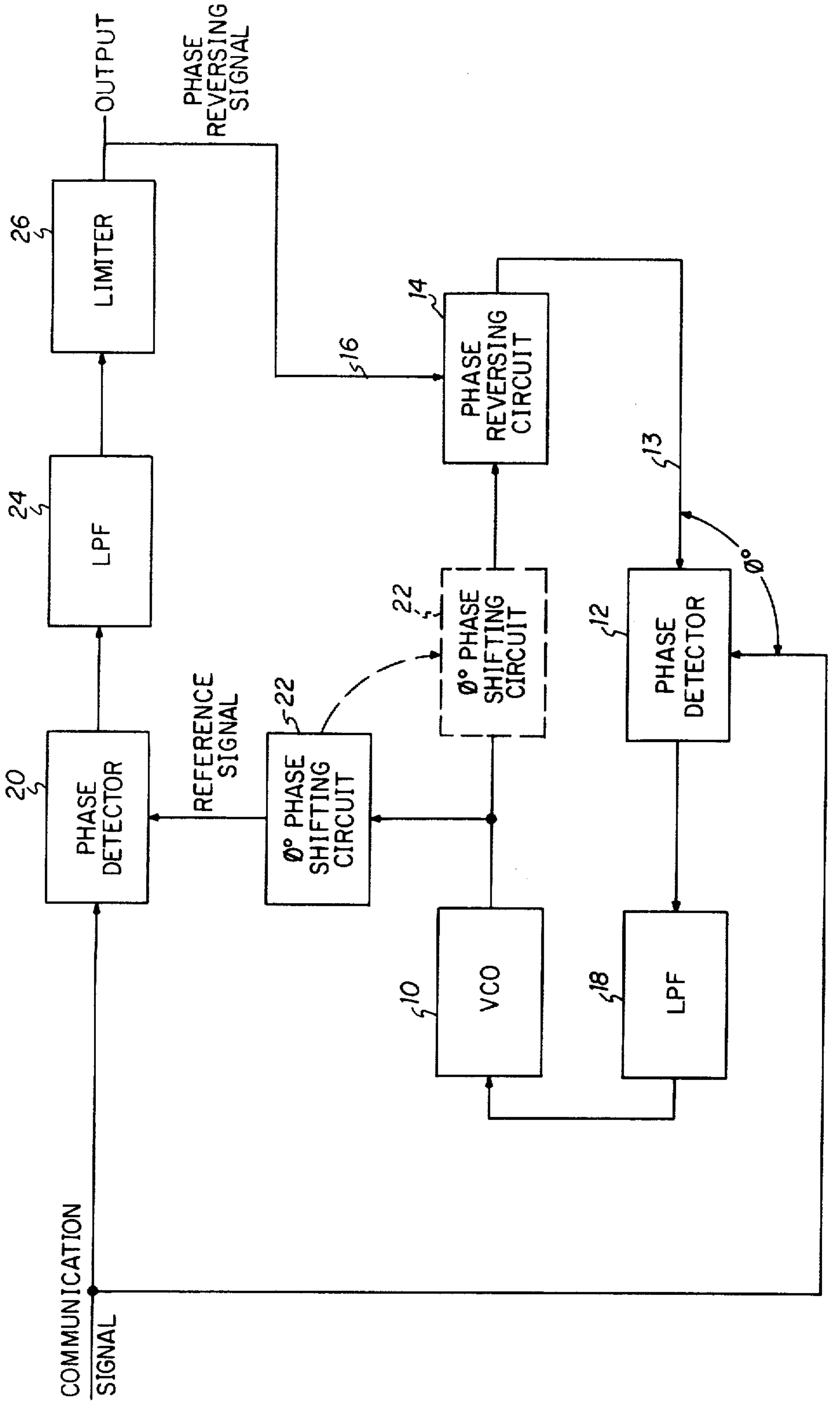
OUTPUT
PHASE REVERSING SIGNAL
26
LIMITER
24
LPF
20
PHASE DETECTOR
REFERENCE SIGNAL
22
Ø° PHASE SHIFTING CIRCUIT
14
PHASE REVERSING CIRCUIT
16
22
Ø° PHASE SHIFTING CIRCUIT
13
Ø°
12
PHASE DETECTOR
10
VCO
18
LPF
COMMUNICATION SIGNAL

DEMODULATOR CIRCUIT FOR PHASE MODULATED COMMUNICATION SIGNALS

BACKGROUND OF THE INVENTION

The present invention pertains generally to demodulator circuits and specifically to such circuits which comprise a phase locked loop circuit and operate on communication signals which contain phase modulation.

In today's rapidly expanding electronic communication field, the use of digital techniques for transmitting and receiving information in the form of binary rather than analog data is materially on the rise probably as a result of the commercial impact created by the pervasive use of digital computers which inherently operate with binary signals as well as the many recognized economic and technical benefits to be obtained from digital techniques. In one well known method for passing binary data between two remote points, commonly referred to as phase shift keying, a communication signal is developed which contains an A.C. carrier whose phase is reversed (changed by 180°) in some predetermined manner in accordance with the binary data applied thereto, (e.g. a phase reversal might indicate one binary logic level while the absence of a phase reversal could indicate the other binary logic level which is just one of many encoding techniques available.) In order to demodulate such a communication signal, it is necessary to provide in the receiving equipment a tracking reference signal; viz. a signal which is always 0° or 180° out-of-phase with the communication signal (referred to as coherent demodulation) and is continuous (no phase change) irrespective of the phase reversals in the communication signal. Such a reference signal is often provided through the use of the well known phase locked loop circuit.

Two widely used circuits which provide such a tracking reference signal by employing phase locked loop operation are disclosed in a technical paper entitled "The Performance of Suppressed Carrier Tracking Loops in the Presence of Frequency Detuning" which can be found in the September, 1970, IEEE Proceedings beginning at page 1315. Although the foregoing reference discusses these circuits in connection with double side band-suppressed carrier communication signals the circuits are equally applicable to phase shift keying communication signals with regard to the reference signal since the same demodulation problem is confronted by both, namely, removing the phase modulation from the communication signal prior to demodulation in order to generate a continuous reference signal for use in the demodulation process. The demodulation process in which the reference signal is used once it has been generated, will of course be different for the two, since phase shift keying does not contain amplitude modulation as does double side band suppressed carrier. This is not germane to the invention, however, as will be appreciated hereinafter. In both of the aforementioned circuits operations are performed on linear signals which require the use of more sophisticated and expensive circuitry than would be required for digital signals because of present digital technology. In the "Costas Circuit," shown in FIG. 2 of the reference, the filtered DC output of a phase detector (upper), which is a linear signal indicative of phase error, is combined with the output of another phase detector (lower) in a multiplier circuit whose output must correlate with the magnitude of the D.C. input applied thereto. In the "Squaring Loop Circuit" of FIG. 1, the magnitude of the communication signal must be squared by the square law device shown therein, which is an implicitly linear operation requiring sophisticated circuity. Thus, the two foregoing circuits cannot fully exploit the benefits to be obtained by digital circuitry because of the particular techniques used therein to remove phase modulation in the communication signal.

In view of the foregoing, it is a primary object of the present invention to provide a new and improved demodulator circuit which provides a continuous reference signal that is unaffected by phase modulation in the communication signal.

It is a further object of the present invention to provide such a new and improved demodulator circuit which can be implemented with less sophisticated and expensive circuitry than prior art devices.

These as well as other objects of the invention will become more readily apparent from a reading of the detailed description of the invention which follows hereinafter when considered in conjunction with the appended drawing, which is a functional block diagram of the invention.

BRIEF DESCRIPTION OF THE INVENTION

The demodulator circuit of the invention provides a local reference signal for coherently demodulating a communication signal containing phase modulation in the form of phase reversals in the carrier. The reference signal, which is continuous irrespective of the carrier phase reversals, is obtained from the output of a voltage controlled oscillator in a phase locked loop circuit wherein a constant control signal is applied to the oscillator by maintaining the magnitude and sense of the phase difference between the input signals to the loop phase detector constant. This is accomplished by generating through another phase detector a bilevel phase reversing signal indicative of the phase difference between the reference and communication signals (always 0° or 80°) which is then used to reverse the phase of the output of the voltage controlled oscillator whenever the communication signal reverses phase prior to comparing its phase with that of the communication signal in the loop phase detector.

DETAILED DESCRIPTION OF THE INVENTION

The demodulator circuit of the invention, as shown generally in the attached drawing, includes a phase locked loop circuit comprising a voltage controlled oscillator (VCO) 10 whose output is applied to a phase detector circuit 12 via a lead 13 through a phase reversing circuit 14 which is connected to receive a bilevel phase reversing signal over a lead 16. The output of the phase reversing circuit 14 is an exact replica of the input signal applied thereto (received from the output of the VCO 10), with 0° phase shift in the presence of one level of phase reversing signal on lead 16 and 180° phase shift in the presence of the other level of phase reversing signal on lead 16. There are numerous well known circuits for accomplishing this; e.g. when the output of the VCO 10 is a square wave as would ordinarily be the case, the phase reversing circuit 14 can be a simple exclusive OR gate, its two inputs being connected to the VCO 10 and lead 16, respectively, so that a logic level "1" on lead 16 causes a phase reversal between the VCO 10 output and the gate output while a logic level "0" on lead 16 causes no phase reversal.

The received communication signal which is to be demodulated is applied to the second input of phase detector 12 whose output provides a control signal to the VCO 10 via a low pass filter (LPF) 18. Phase detector 12 provides an output signal which is indicative of the phase difference $\phi°$ (magnitude as well as sense or sign of the angle) between the two signals applied thereto which is then filtered by the LPF 18 to provide a D.C. control signal which is applied to the input of the VCO 10. As is well known, phase lock occurs when the phase difference $\phi°$ between the input signals becomes 90°, with the output of the VCO 10 changing, when required, in response to the control signal so as to maintain the phase difference at 90° (the sense or sign of the phase difference being maintained as well as the magnitude). However, since phase locked loop operation is not necessarily limited to the customary 90° phase difference around the loop, the invention also need not be so limited. Phase detectors for use in phase locked loop circuits are well known and are described in a number of references such as a patent issued to J. J. Andres (U.S. Pat. No. 3,431,509) entitled "Phase Locked Loop with Digitalized Frequency and Phase Discriminator."

The output of the VCO 10 is applied to another phase detector circuit 20 via a $\phi°$ phase shifting circuit 22 which is required because of the $\phi°$ phase shift inherent in phase locked loop circuits as already mentioned. The $\phi°$ phase shift introduced by phase shift circuit 22 is in the opposite direction from the phase shift $\phi°$ introduced by the phase locked loop operation. The output of the phase shifting circuit 22 provides a local reference signal which is combined with the communication signal in the phase detector 20 to produce an output signal indicative of the phase difference therebetween. The output of the phase detector 20 is applied to the phase reversing circuit 14 via lead 16 through a low pass filter (LPF) 24 for eliminating unwanted high frequencies and a limiter circuit 26 for removing the undesirable effects of amplitude variations. Since once tracking occurs, the phase difference between the reference and communication signals is always either 0° or 180° (phase locked loop $\phi°$ phase shift compensated by $\phi°$ phase shift of phase shift circuit 22), commonly referred to as coherent demodulation, there are only two output signals which the phase detector 20 can produce corresponding thereto, resulting in the previously discussed bilevel phase reversing signal on lead 16.

As mentioned earlier, the demodulator circuit of the invention is designed to operate with communication signals containing phase modulation in the form of phase reversals in the carrier. In analyzing its operation, let us assume that phase locked loop has been attained and the reference signal applied to the phase detector 20 is properly tracking the communication signal. In order for the demodulator circuit to continue functioning properly, the reference signal applied to the phase detector 20 must be continuous (not phase changes) irrespective of phase reversals in the communication signal which of course requires that the output of the VCO 10 be continuous, thereby further requiring a constant control signal to its input. Consequently, the output of phase detector 12 must remain effectively unchanged at all times, necessitating that the phase difference $\phi°$ (magnitude and sign) between its two input signals remain constant at $\phi°$. This will be so if each time the phase of the communication signal reverses, the phase of the other input signal to the phase detector 12 via lead 13 also reverses. The latter phase reversal is accomplished by the phase reversing circuit 14. Each time the communication signal reverses phase, the level of the phase reversing signal on lead 16 also changes (since the phase of the reference signal does not change), thereby changing the phase of the output signal of the phase reversing circuit 14 by 180° from what it was previously. When the communication signal reverts back to its prior phase, the output of the phase detector 20 once again changes so that the phase reversing signal on lead 16 also reverts back to its former level. Each time the communication signal changes phase by 180° so does the output of the phase reversing circuit 14 so that the phase difference $\phi°$ (magnitude and sign) between the two input signals to the phase detector 12 always remains constant. Even though the communication signal reverses phase and the output of the phase reversing circuit 14 changes phase in like manner, the output of the VCO 10 remains unchanged so that a continuous reference signal for tracking the communication signal is provided to phase detector 20. It is to be noted that the $\phi$ phase shifting circuit 22 could just as well be serially placed in the phase locked loop circuit either before (represented by the dashed block in the drawing) or after the phase reversing circuit 14 in which case the output of the VCO 10 would be directly applied to phase detector 20 since it would always be 0° or 180° out-of-phase with the communication signal.

The embodiment of the invention depicted herein could be directly used as shown for retrieving binary data from a phase shift keying communication signal at the output of the limiter 26. In the case of double side band-suppressed carrier communication signals, the amplitude modulation must be maintained for proper demodulation so that in that case phase detector 20 should be replaced with a straight multiplier circuit if redundant circuitry is to be eliminated (whose output would provide the sought data as well as the phase reversing signal via LPF 24 and limiter 26) or alternatively a separate demodulator utilizing the reference signal generated by the present invention could be used.

It will be readily seen that the demodulator circuit of the invention requires no analog circuitry for performing linear mathematical operations as does prior art circuits. Most if not all components can be implemented with well known digital circuitry regardless of the A.C. waveforms (it being realized that sinusoidal signals can be converted to square wave signals for digital operations through well known circuits such as a Schmitt Trigger Circuit). Thus, because of the current state of digital technology and the demodulation technique used herein, the invention can be built cheaper and smaller than other demodulator circuits currently available. Since various modifications readily apparent to those familiar with the art can be made without departing from the scope and spirit of the invention, the specific embodiment disclosed herein is intended to be merely illustrative and not restrictive of the invention as will now be claimed hereinbelow.

What is claimed is:

1. A demodulator circuit for providing a local reference signal for coherently demodulating communication signals containing phase modulation in the form of phase reversals in the carrier signal, comprising:

a voltage controlled oscillator for phase locked loop operation;

phase shifting circuit means for providing a reference signal which is out of phase with the output of said voltage controlled oscillator by the same amount and in a direction opposite to the phase shift produced by phase locked loop operation;

first detector circuit means for providing a bilevel phase reversing signal which constitutes the demodulated output whose level is dependent on the phase difference between the communication and reference signals;

phase reversing circuit means for providing a signal at its output which is 0° or 180° out-of-phase with the output of said voltage controlled oscillator, the phase shift being dependent on the level of said phase reversing signal; and second detector circuit means for applying to said voltage controlled oscillator a control signal which is indicative of the phase difference between the communication signal and the output of said phase reversing circuit means.

2. The demodulator circuit of claim 1 wherein said first circuit means includes a phase detector for receiving the communication and reference signals and a low pass filter and limiter circuit connected in series between the detector output and said phase reversing circuit means.

3. A demodulator circuit for providing a local reference signal for coherently demodulating a communication signal containing phase modulation in the form of phase reversals in the carrier signal comprising:

a voltage controlled oscillator for phase locked loop operation;

first detector circuit means for providing a bilevel phase reversing signal which constitutes the demodulated output whose level is dependent on the phase difference between the communication signal and the output of said voltage controlled oscillator;

phase reversing circuit means for shifting a signal by 0° or 180°, the shift being dependent on the level of said phase reversing signal;

second detector circuit means for applying to said voltage controlled oscillator a control signal indicative of the phase difference between the communication signal and another signal applied to a second input thereof; and circuit means for applying the output of said voltage controlled oscillator to the second input of said second detector circuit means via said phase reversing circuit including means for shifting the phase of the signal passing therethrough by the amount required for phase locked loop operation.

4. The demodulator circuit of claim 3 wherein said first detector circuit means includes a phase detector, a low pass filter and a limiter circuit connected in series with each other.

* * * * *